(12) United States Patent
Abe

(10) Patent No.: US 7,919,905 B2
(45) Date of Patent: Apr. 5, 2011

(54) MAGNETIC HEAD ACTUATOR HAVING CONDUCTIVE FASTENING MEMBER ELECTRICALLY CONNECTING UPPER AND LOWER PIEZOELECTRIC ELEMENTS

(75) Inventor: Takayuki Abe, Miyagi (JP)

(73) Assignee: Sony Corporation, Tokyo (JP)

( * ) Notice: Subject to any disclaimer, the term of this patent is extended or adjusted under 35 U.S.C. 154(b) by 857 days.

(21) Appl. No.: 11/715,150

(22) Filed: Mar. 7, 2007

(65) Prior Publication Data

US 2007/0211389 A1   Sep. 13, 2007

(30) Foreign Application Priority Data

Mar. 10, 2006   (JP) ................ P2006-065007

(51) Int. Cl.
*H01L 41/08* (2006.01)
(52) U.S. Cl. ...................... 310/332; 310/330
(58) Field of Classification Search ........... 310/330–332
See application file for complete search history.

(56) References Cited

U.S. PATENT DOCUMENTS

| | | | | |
|---|---|---|---|---|
| 4,099,211 A | * | 7/1978 | Hathaway | 360/292 |
| 4,288,824 A | * | 9/1981 | Watanabe | 360/75 |
| 4,363,993 A | * | 12/1982 | Nishigaki et al. | 310/332 |
| 5,036,419 A | * | 7/1991 | Okauchi et al. | 360/291.9 |
| 5,408,376 A | * | 4/1995 | Nishikura et al. | 360/292 |

FOREIGN PATENT DOCUMENTS

| | | |
|---|---|---|
| JP | 56011620 A * | 2/1981 |
| JP | 62-163978 | 7/1987 |
| JP | 04-285719 | 10/1992 |
| JP | 09-073619 | 3/1997 |
| JP | 09-171614 | 6/1997 |
| JP | 11-126318 | 5/1999 |
| JP | 11-232624 | 8/1999 |
| JP | 2005-216385 | 8/2005 |

* cited by examiner

*Primary Examiner* — J. SanMartin
(74) *Attorney, Agent, or Firm* — Robert J. Depke; Rockey, Depke & Lyons, LLC

(57) ABSTRACT

An actuator includes a piezoelectric bimorph including a pair of piezoelectric elements and an intermediate electrode provided between the piezoelectric elements, a conductive fastening member for fastening fixed ends of the piezoelectric elements to a base having a ground potential, and a contact member to which a predetermined voltage is applied. The contact member is in contact with the intermediate electrode.

5 Claims, 12 Drawing Sheets

SERIES TYPE (a)

(b)

PARALLEL TYPE (a)

(b)

MAGNETIC HEAD ACTUATOR HAVING CONDUCTIVE FASTENING MEMBER ELECTRICALLY CONNECTING UPPER AND LOWER PIEZOELECTRIC ELEMENTS

CROSS REFERENCES TO RELATED APPLICATIONS

The present invention contains subject matter related to Japanese Patent Application JP 2006-065007 filed in the Japanese Patent Office on Mar. 10, 2006, the entire contents of which are incorporated herein by reference.

BACKGROUND OF THE INVENTION

1. Field of the Invention

The present invention relates to an actuator in which a piezoelectric bimorph allows adjustment of the mounting height of a magnetic head on a rotary drum, for example, in a video tape recorder (VTR), and to a magnetic head device including the actuator.

2. Description of the Related Art

FIG. 10 shows an example of a structure of a rotary head device (magnetic head device) used in known video tape recorders (VTRs) and digital audio tape (DAT) recorders. Referring to FIG. 10, a rotary head device 1 includes a fixed drum 2, a rotary drum 3 that is rotatably supported by the fixed drum 2 and is rotated by a motor (not shown), and a magnetic head 4 slightly protruding from a peripheral surface of the rotary drum 3.

During tape recording and reproduction in the rotary head device 1 having the above-described structure, the rotary drum 3 is rotated at high speed, and a magnetic tape 5 is wound around a part of the peripheral surface of the rotary drum 3, as shown in FIG. 11. In this case, the magnetic head 4 obliquely touches the magnetic tape 5 by so-called head tracing, as shown by the arrow in FIG. 12, and performs magnetic recording on recording tracks 5a or reproduces electrical signals recorded on the recording tracks 5a.

FIG. 13 is a cross-sectional view of a contact portion between the magnetic head 4 and the magnetic tape 5. The magnetic head 4 is fixedly held on the rotary drum 3 with a mounting member 4a disposed therebetween. In this case, traceability of the magnetic head 4 with respect to the pattern of the recording track 5a on the magnetic tape 5 greatly varies in accordance with the mounting height of the magnetic head 4 in the y-direction.

For example, when the mounting height of the magnetic head 4 shifts, a path A of the magnetic head 4 on the magnetic tape 5 deviates from the pattern of the recording track 5a, as shown in FIG. 14. Consequently, precise tracing is difficult.

Therefore, it is necessary to precisely adjust the mounting height of the magnetic head 4. On the other hand, the winding state of the magnetic tape 5 around the rotary drum 3 is optimized, for example, by means of tape guides 6 and a tape tensioning mechanism (not shown).

For that purpose, it is known to adjust the mounting height of the magnetic head 4 by means of a piezoelectric actuator 7 serving as a mounting member for mounting the magnetic head 4 on the rotary drum 3, as shown in FIG. 15. The piezoelectric actuator 7 shown in FIG. 15 utilizes an inverse piezoelectric effect that produces strain proportional to the electric field applied to piezoelectric ceramics. In the piezoelectric actuator 7, piezoelectric plates 7b and 7c, each of which is formed of a piezoelectric thin plate, are respectively bonded to both surfaces of a central member 7a. The central member 7a is formed of a thin plate that is resistant to expansion and contraction.

The central member 7a is made of a light material having a low coefficient of linear expansion, such as a titanium alloy, stainless steel, or a carbon fiber resin material in which carbon fiber and resin are mixed at a predetermined compound ratio. The piezoelectric plates 7b and 7c are made of, for example, ceramic or resin having piezoelectricity. Electrodes (not shown) are formed on surfaces of the piezoelectric plates 7b and 7c by plating, vapor deposition, baking, or other means, and are subjected to polarization. This allows the piezoelectric actuator 7 to be displaced in accordance with the direction and intensity of the applied electric field.

One end (right end in FIG. 15) of the piezoelectric actuator 7 is fixedly sandwiched between fixing members 8. One or both of the fixing members 8 are fixed to the rotary drum 3 by a screw or the like. For example, the magnetic head 4 is fixed to a lower surface of the other end (left end) of the piezoelectric actuator 7 by an instant adhesive, and is reinforced by ultraviolet curable resin, as necessary.

In the piezoelectric actuator 7 having the above-described structure, a driving voltage is applied from a power source (not shown) between the electrodes of the piezoelectric plates 7b and 7c and the central member 7a. In this case, the piezoelectric plate 7b contracts in the longitudinal direction because an electric field is applied thereto in the same direction as (or opposite to) the polarizing direction, and the piezoelectric plate 7c expands in the longitudinal direction because an electric field is applied thereto in a direction opposite to (or the same as) the polarizing direction.

Therefore, the piezoelectric actuator 7 is bent upward at the left end, and is displaced as a whole in the y-direction, as shown in FIG. 16. Since the amount of deformation due to this bending is controlled in accordance with the intensity of the electric field, an electrically controlled actuator is achieved.

The magnetic head device shown in FIGS. 10 and 16 is disclosed in, for example, Japanese Unexamined Patent Application Publication No. 11-126318. FIG. 17 is a perspective view of a magnetic head device described in this publication. The magnetic head device includes a trapezoidal piezoelectric bimorph 10, a fixing member 11a that fixes the piezoelectric bimorph 10 and that has screw holes used to fix the piezoelectric bimorph 10 to a drum, fixing members 11b and 11c that sandwich the piezoelectric bimorph 10 and a thin plate 12 therebetween, the thin plate 12, a VH flexible board 13a bonded to the thin plate 12, a magnetic head 14, a head base 15 that allows the magnetic head 14 to be fixed to a leading end of the piezoelectric bimorph 10, and coils 16 provided in the magnetic head 14.

The piezoelectric bimorph 10 includes piezoelectric plates 10a and 10b, an intermediate electrode 10c, and surface electrodes 10d and 10e.

SUMMARY OF THE INVENTION

A piezoelectric bimorph is driven by a series method (three-terminal structure) shown in FIGS. 18A(a) and 18A(b), or a parallel method (two-terminal structure) shown in FIGS. 18B(a) and 18B(b). FIGS. 18A(a) and 18B(a) show the polarizing directions of the piezoelectric bimorph, and FIGS. 18A(b) and 18B(b) are equivalent circuit diagrams of driving power sources.

FIG. 19 shows the relationship between the applied voltage and the amplitude (amount of displacement) in these series and parallel driving methods for the piezoelectric bimorph.

When a high voltage is applied, the series driving method can produce a large displacement. In contrast, when a low voltage is applied, the parallel driving method can produce a larger displacement than the series driving method. Further, in the three-terminal structure for the series driving method, wiring is necessary for each of upper, intermediate, and lower electrodes. In contrast, in the two-terminal structure for the parallel method, the piezoelectric bimorph can be driven by performing wiring of a surface electrode, which is obtained by short-circuiting upper and lower electrodes, and an intermediate electrode.

In a bimorph actuator used in known magnetic head devices, a piezoelectric bimorph is driven by the series method shown in FIGS. 18A(a) and 18A(b), and a large displacement is produced at a high voltage by cutting an electric field applied in the direction opposite to the polarizing direction by a Zener diode so that the electric field does not exceed a coercive field of the piezoelectric element. This prevents the piezoelectric element from being depolarized by the application of a large electric field. Unfortunately, the three-terminal structure including HOT, SHIM, and GND terminals is adopted in order to drive this actuator, and therefore, the number of components and assembly cost are increased.

Moreover, when the piezoelectric actuator is used below the coercive field of the piezoelectric element, the amount of displacement per unit voltage is smaller in the series method than in the parallel method, as shown in FIG. 19. Therefore, the series method is disadvantageous for the actuator that is driven at a low voltage.

In addition, since a high potential is applied to one side of the bimorph in the series method, when the bimorph is driven with an MR (magnetoresistive) element, which is particularly susceptible to static electricity, bonded thereto, the MR element may be broken by electrostatic discharge (ESD).

Conventionally, the piezoelectric bimorph is connected to the driving source by terminals and lead wires, as shown in FIG. 20. FIG. 20 shows an example of a conventional bimorph actuator. The bimorph actuator includes a piezoelectric bimorph 20 in which an intermediate electrode 20c is provided between a pair of piezoelectric plates 20a and 20b.

A head chip 25 having a magnetic head 24 is bonded to a surface of a movable end of the piezoelectric plate 20b. Fixed ends of the piezoelectric plates 20a and 20b are sandwiched between fixing members 26a and 26b. The fixing members 26a and 26b are attached to a rotary drum (not shown).

A flexible printed board 27 for transmitting a magnetic signal is provided on the fixing member 26a, and extends to a movable end of the piezoelectric plate 20a. A substrate surface 27a of the flexible printed board 27 is connected to the magnetic head 24 by an extra fine wire (not shown). A SHIM terminal 28 is fitted on a fixed end of the intermediate electrode 20c, and is soldered to a lead wire 29a. A HOT terminal 30 is attached to the fixed end of the piezoelectric plate 20a, and is soldered to a lead wire 29b.

In actuality, a soldered portion between the lead wire 29a and the SHIM terminal 28 and a soldered portion between the lead wire 29b and the HOT terminal 30 are covered with an adhesive such as bond (not shown).

In this way, wiring using the terminals and lead wires is necessary to apply a driving voltage in the bimorph actuator used in the conventional magnetic head device. This increases the number of components, assembly cost, and manufacturing cost.

Accordingly, it is desirable to provide an actuator and a magnetic head device in which the number of components, assembly cost, and manufacturing cost are reduced by eliminating the necessity of wiring for applying a driving voltage, and in which noise and electrostatic damage of a magnetic head mounted on the actuator are avoided.

An actuator according to an embodiment of the present invention includes a piezoelectric bimorph including a pair of piezoelectric elements, and an intermediate electrode provided between the piezoelectric elements; a conductive fastening member for fastening fixed ends of the piezoelectric elements to a base having a ground potential; and a contact member to which a predetermined voltage is applied. The contact member is in contact with the intermediate electrode.

Preferably, a head chip having a magnetic head is bonded to a movable end of at least one of the piezoelectric elements.

Preferably, the base is a rotary drum.

The base may be a magnetic head body opposing a linear tape on which recording and reproduction are performed in a linear manner.

A magnetic head device according to another embodiment of the present invention includes an actuator. The actuator includes a piezoelectric bimorph including a pair of piezoelectric elements, and an intermediate electrode provided between the piezoelectric elements; a conductive fastening member for fastening fixed ends of the piezoelectric elements to a base having a ground potential; and a contact member to which a predetermined voltage is applied. The contact member is in contact with the intermediate electrode.

In the above-described configuration, since the piezoelectric elements are fastened to the base having a ground potential by the conductive fastening member, they also have a ground potential. A predetermined voltage is applied to the intermediate electrode through the contact member. For this reason, the piezoelectric bimorph is driven by a so-called parallel method. Since wiring is unnecessary for the surfaces of the piezoelectric elements and the intermediate electrode, the number of components, manufacturing cost, and assembly cost can be reduced.

Since the surfaces of the piezoelectric elements are at a ground potential, the surface of the head chip bonded to the piezoelectric elements are also at a ground potential. Consequently, noise in reduced in an MR (magnetoresistive) element or a GMR (giant magnetoresistive) element that is susceptible to static electricity, and electrostatic damage thereto is prevented.

More specifically, the following features are employed:

(1) The piezoelectric bimorph used in the magnetic head device is driven by a parallel method. In the actuator, both surfaces of the bimorph are covered with metal, a ceramic material subjected to a conduction process, or conductive resin. The actuator is fastened to the drum by a screw formed of metal or conductive resin, and the actuator is grounded. A voltage is applied to the intermediate electrode by a pin contact or a spring contact.

(2) The number of components is reduced by eliminating wiring in the actuator alone.

(3) Damage to an MR element, which is particularly susceptible to electrostatic electricity, is prevented by giving a ground potential to both surfaces of the piezoelectric bimorph.

(4) Noise in the MR element is avoided by giving a ground potential to both surfaces of the piezoelectric bimorph.

(5) Head chips are respectively bonded to both surface of the bimorph by giving a ground potential to the surfaces of the piezoelectric bimorph.

According to the embodiments of the present invention, there is no need to perform wiring for applying driving power for the piezoelectric bimorph. This can reduce the number of components, manufacturing cost, and assembly cost.

In addition, since the bonded head chip can have a ground potential, noise can be reduced in an MR element or a GMF element that is susceptible to static electricity, and electrostatic damage to the element can be prevented.

DESCRIPTION OF THE PREFERRED EMBODIMENTS

Figure 1A:
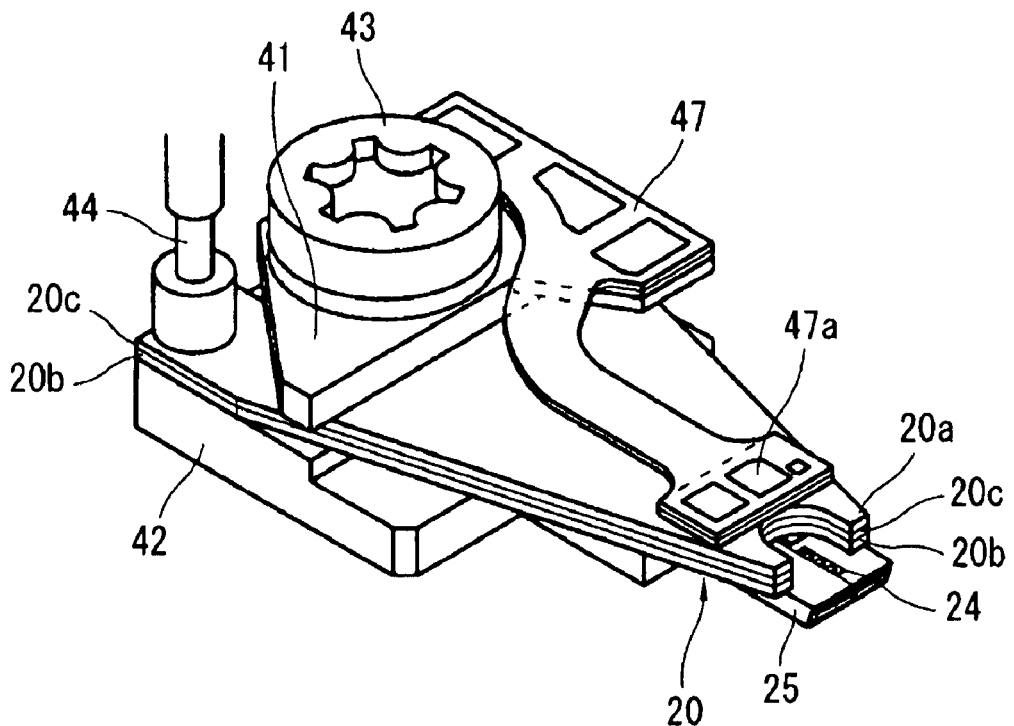
FIG. 1A is a perspective view of an actuator according to an embodiment of the present invention.

While embodiments of the present invention will be described below with reference to the drawings, the invention is limited to the embodiments.

FIG. 1 shows a piezoelectric actuator according to an embodiment of the present invention. In this embodiment, the piezoelectric actuator utilizes an inverse piezoelectric effect that produces strain proportional to an electric field applied to piezoelectric ceramics. This piezoelectric actuator is generally called a piezoelectric bimorph.

In a piezoelectric bimorph 20, piezoelectric plates 20a and 20b (a pair of piezoelectric elements), each of which is formed of a piezoelectric thin plate, are respectively bonded to both surfaces of an intermediate electrode 20c. The intermediate electrode 20c is formed of a thin plate that is resistant to expansion and contraction, and serves as a central member.

For example, the intermediate electrode 20c is made of a light material having a low coefficient of linear expansion, such as a titanium alloy, stainless steel, or a carbon fiber resin material in which carbon fiber and resin are mixed at a predetermined compound ratio.

The piezoelectric plates 20a and 20b are formed of, for example, a ceramic material such as barium titanate or lead zirconate, or a high polymer material such as polyvinylidene fluoride.

An outer surface of each of the piezoelectric plates 20a and 20b is made of a metal material, such as nickel, silver, molybdenum, or tin, or an alloy of these materials. For example, a surface electrode is formed by a method in which paste made of the above-described material is applied on the surface of the piezoelectric plate by printing and is then dried or baked, or by other methods such as metal spraying, vacuum deposition, sputtering, and electroless plating.

Each of the piezoelectric plates 20a and 20b is subjected to polarization, and displacement is thereby produced in accordance with the direction and intensity of an electric field applied thereto.

A fixed end of the piezoelectric bimorph 20 is sandwiched between an upper holder 41 having a screw hole 41a for fixing to a rotary drum (base; not shown), and a base holder 42, and is fixed by an adhesive such as thermosetting resin, anaerobic setting resin, or instant adhesive. The upper holder 41 and the base holder 42 are fixed to the rotary drum by a screw (conductive fastening member) 43.

The upper holder 41 and the base holder 42 are made of a conductive material such as aluminum or brass, or an insulating material plated with a conductive material.

A head chip 25 having a magnetic head 24 is fixed to a movable end of the piezoelectric bimorph 20 by an instant adhesive or the like, and is reinforced by ultraviolet curable resin or the like, as necessary.

A flexible printed board 47 (including a printed board) for transmitting a magnetic signal is mounted on an upper surface of the upper holder 41. The flexible printed board 47 extends to a movable end of the piezoelectric plate 20a.

A substrate surface 47a of the flexible printed board 47 is connected to the magnetic head 24 by an extra fine wire (not shown).

The screw 43 is made of a conductive material such as aluminum or brass, or an insulating material plated with a conductive material. A pin contact 44 for applying a driving voltage is in contact with a fixed end of the intermediate electrode 20c.

By fastening the piezoelectric bimorph 20 to the rotary drum by the conductive screw 43, the surfaces of the piezoelectric plates 20a and 20b are inevitably short-circuited without performing wiring using a lead wire. By making the potential of the rotary drum a ground potential, the necessity of wiring the piezoelectric actuator alone is eliminated.

The surface of the piezoelectric bimorph 20 is grounded in consideration of protection of an MR element or a GMR element that is susceptible to static electricity. Since the surface of the head chip 25 has a ground potential, noise is reduced.

Figure 1B:
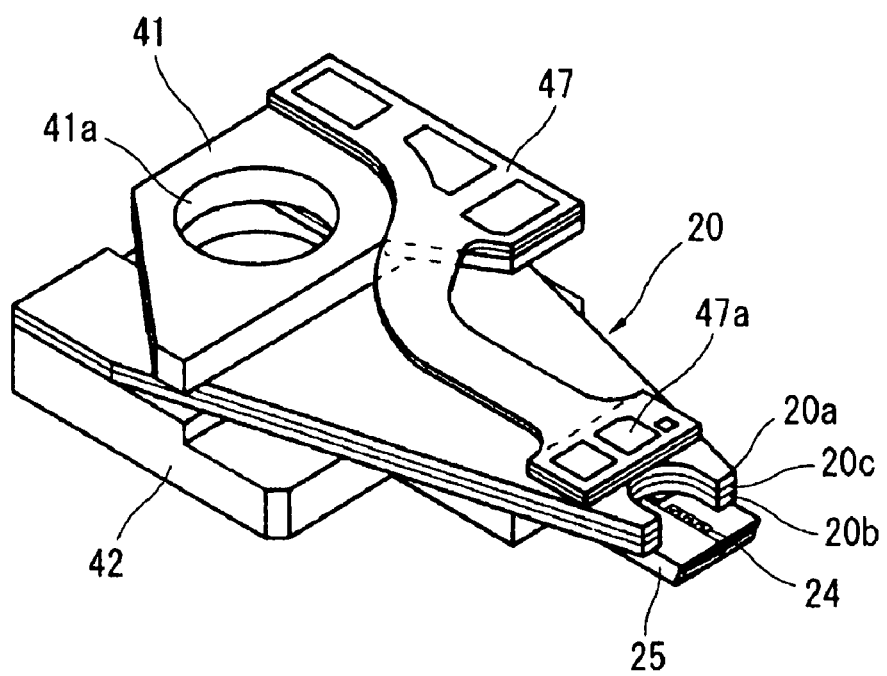
FIG. 1B is a perspective view of the principal part of the actuator.

The screw 43 and the pin contact 44 are not shown in FIG. 1B. As shown in FIG. 1B, the intermediate electrode 20c is not provided in a section to which the screw 43 is fastened through the screw hole 41a (for example, a cut having a slightly larger diameter than that of the screw hole 41a is provided in the intermediate electrode 20c).

Figure 2:
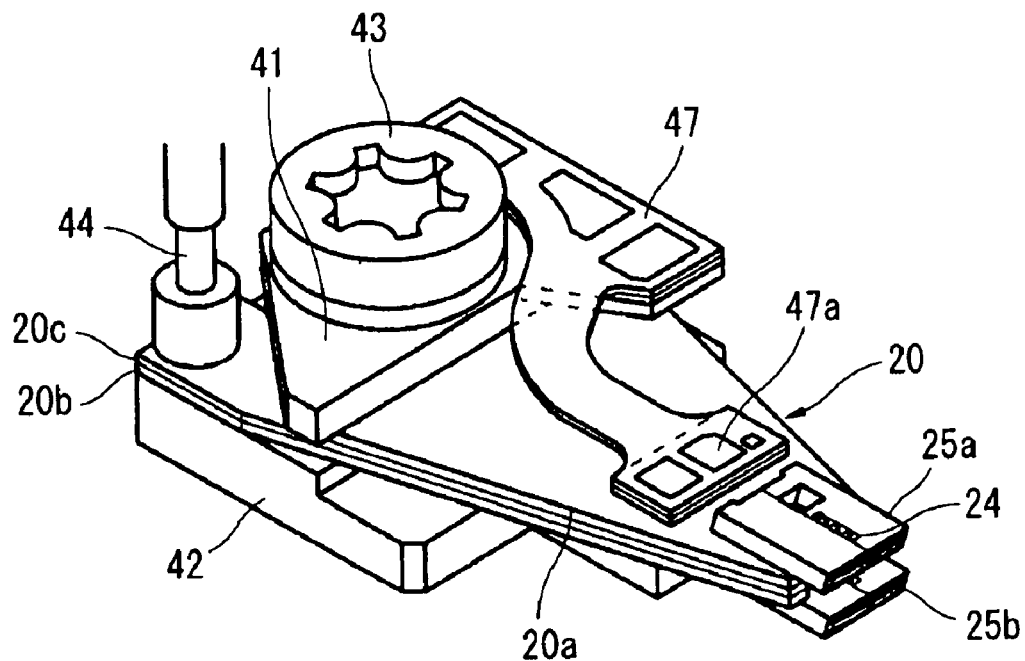
FIG. 2 is a perspective view of an actuator according to another embodiment of the present invention.

By this fastening, a ground potential is given to both surfaces of the piezoelectric bimorph 20 through the screw 43. Therefore, even when head chips 25a and 25b similar to the head chip 25 in FIGS. 1A and 1B are respectively bonded to the front and back surfaces of the piezoelectric bimorph 20, that is, the surfaces of both the piezoelectric plates 20a and 20b, as shown in FIG. 2, a driving voltage is not applied to the head chips 25a and 25b. Consequently, a piezoelectric actuator having a double chip structure can be achieved.

Figure 3:
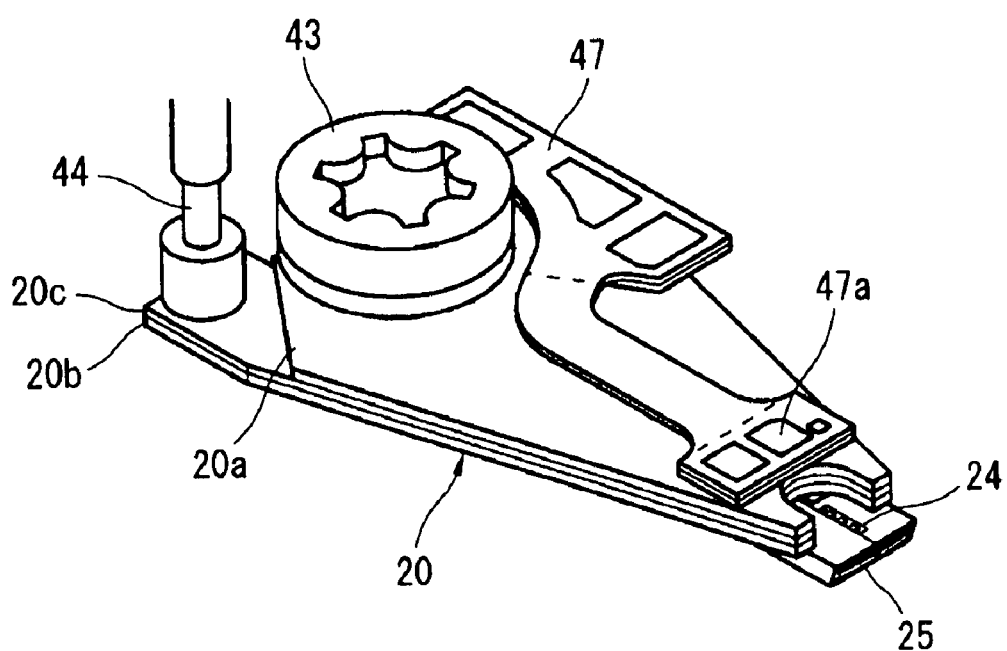
FIG. 3 is a perspective view of an actuator according to a further embodiment of the present invention.

By directly fastening a piezoelectric bimorph 20 to a rotary drum by a screw 43 without using the upper holder 41 and the base holder 42 serving as the fixing members, as shown in FIG. 3, each surface of the bimorph 20 is given a ground potential, and a head chip 25 can be moved.

Figure 4:
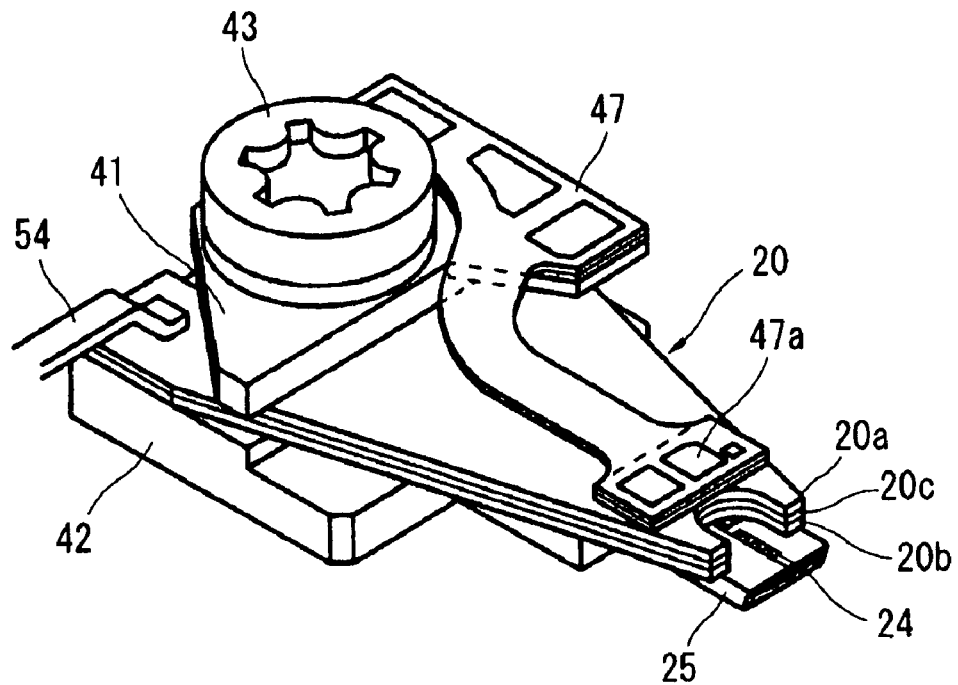
FIG. 4 is a perspective view of an actuator according to a still further embodiment of the present invention.
Figure 5:
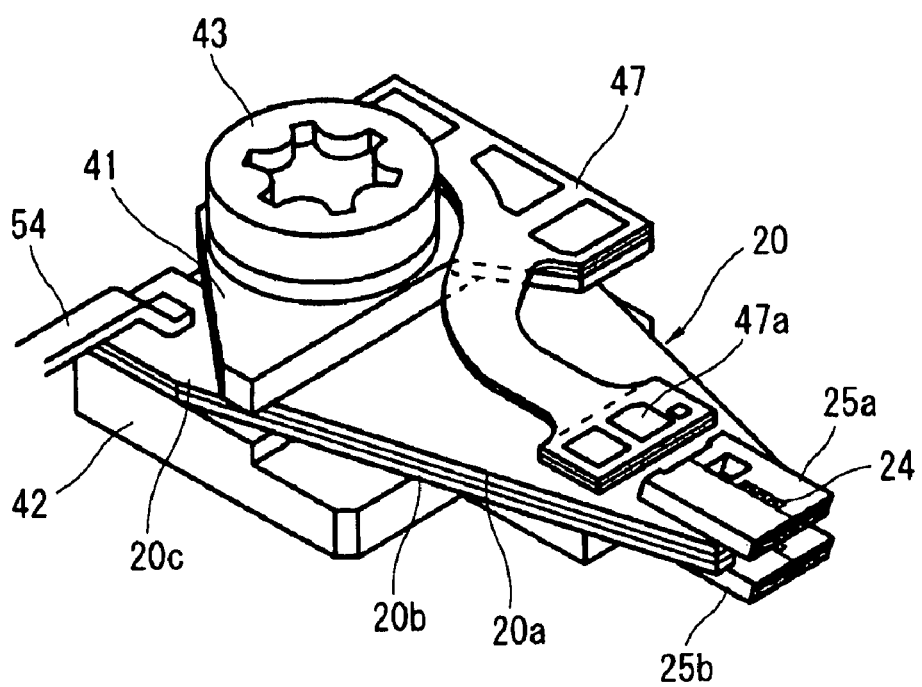
FIG. 5 is a perspective view of an actuator according to a still further embodiment of the present invention.
Figure 6:
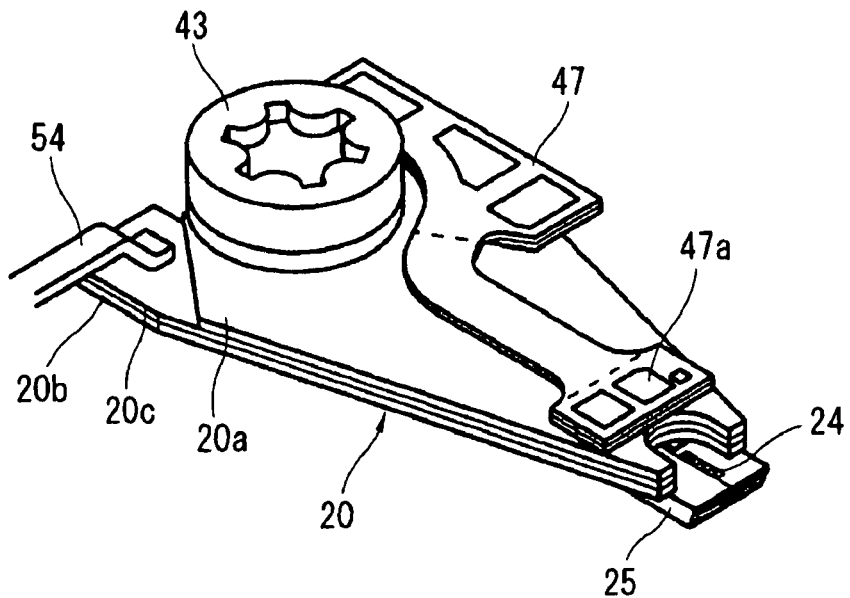
FIG. 6 is a perspective view of an actuator according to a still further embodiment of the present invention.

The pin contact 44 for driving-voltage application may be replaced with a spring contact 54, as shown in FIGS. 4 to 6. FIG. 4 shows an embodiment in which the head chip 25 shown in FIGS. 1A and 1B is provided on only one surface of a piezoelectric bimorph 20, FIG. 5 shows an embodiment in which the head chips 25a and 25b shown in FIG. 2 are respectively provided on both surfaces of a piezoelectric bimorph 20, and FIG. 6 shows an embodiment in which a piezoelectric bimorph 20 is directly fastened to a rotary drum without using the fastening member shown in FIG. 3. In FIGS. 4 to 6, the same components as those in FIGS. 1 to 3 are denoted by the same reference numerals.

Figure 7:
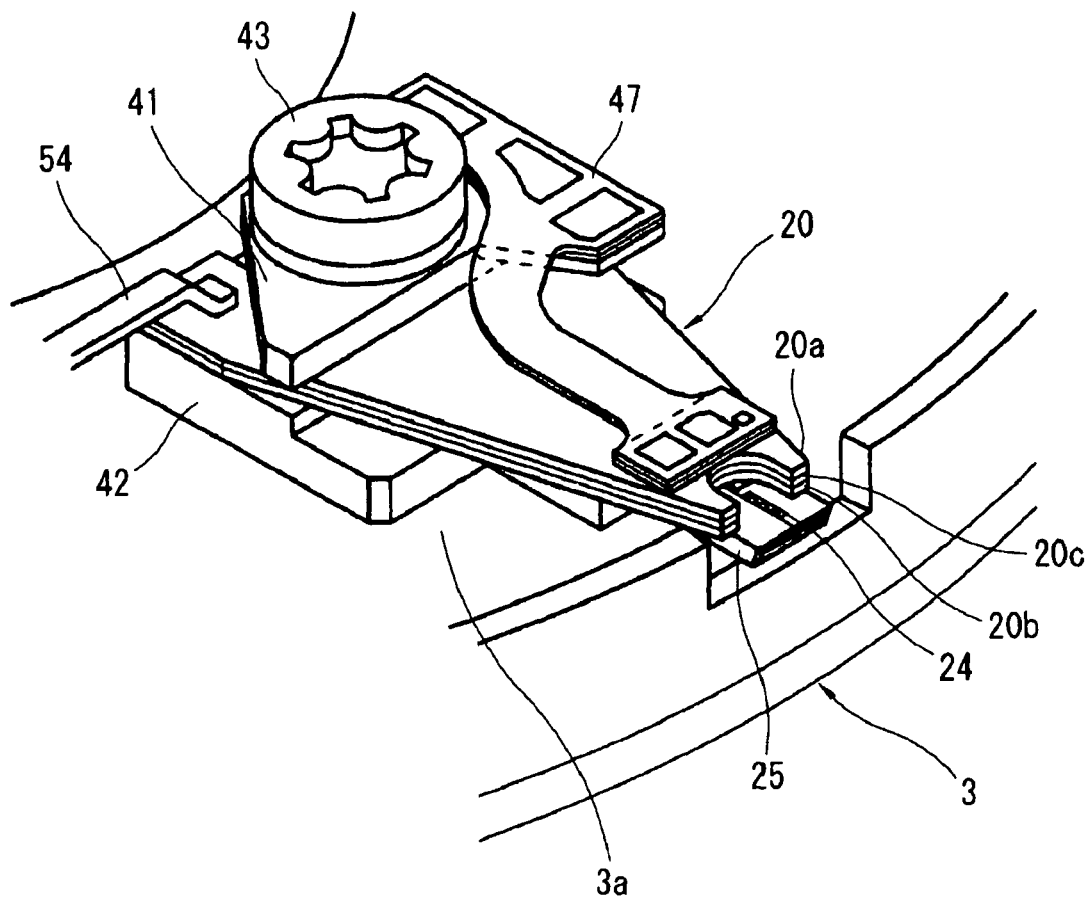
FIG. 7 is a perspective view of the principal part showing a state in which the actuator shown in FIG. 4 is mounted on a rotary drum.

FIG. 7 is a perspective view showing a state in which the actuator shown in FIG. 4 is fastened on a mounting surface 3a of a rotary drum 3.

Figure 8:
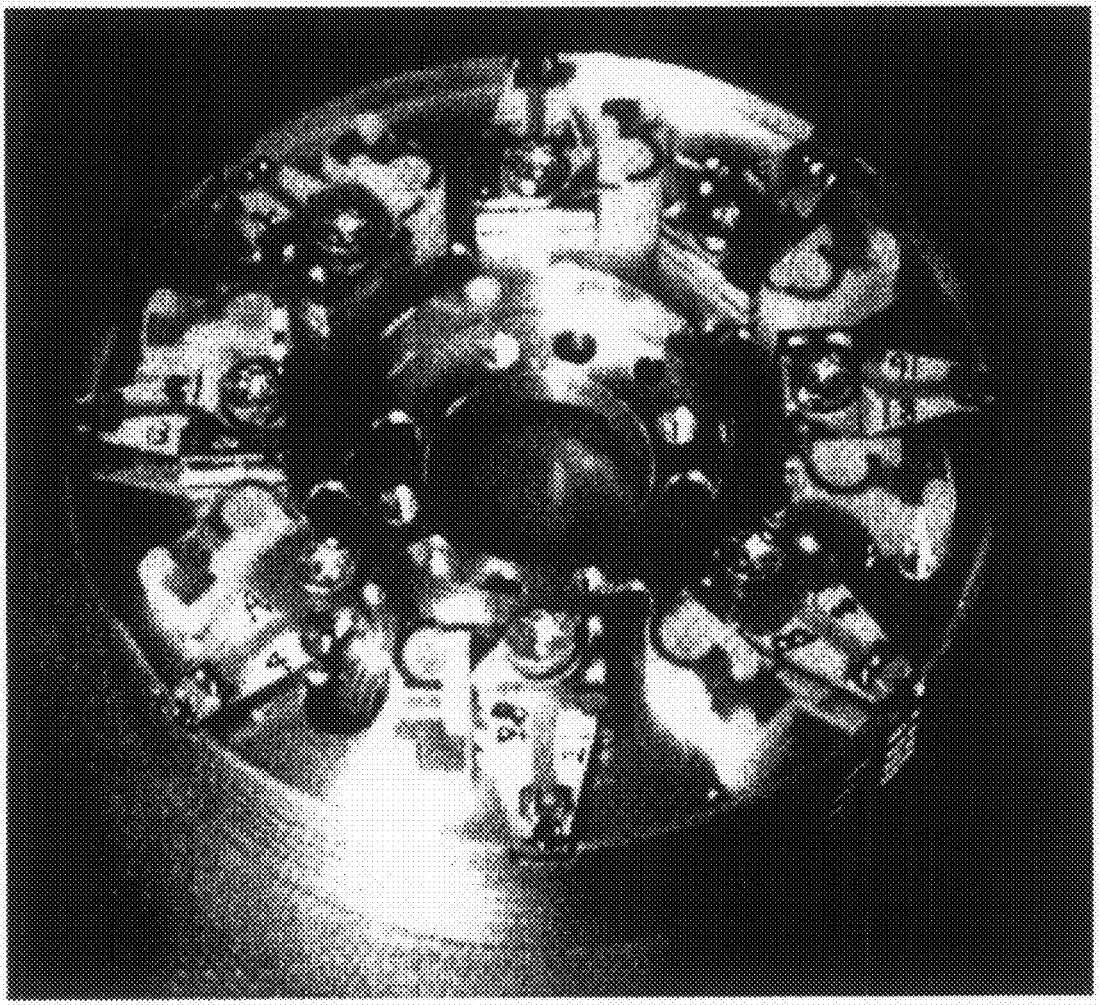
FIG. 8 is a perspective view showing a state in which a plurality of actuators according to any of the embodiments are mounted on the rotary drum.

FIG. 8 is a perspective view showing a state in which the actuator shown in FIG. 4 are fastened at eight positions on the mounting surface 3a of the rotary drum 3.

As shown in FIGS. 7 and 8, there is no need to perform wiring of the actuator alone, and therefore, the configuration is simplified extremely.

Figure 9:
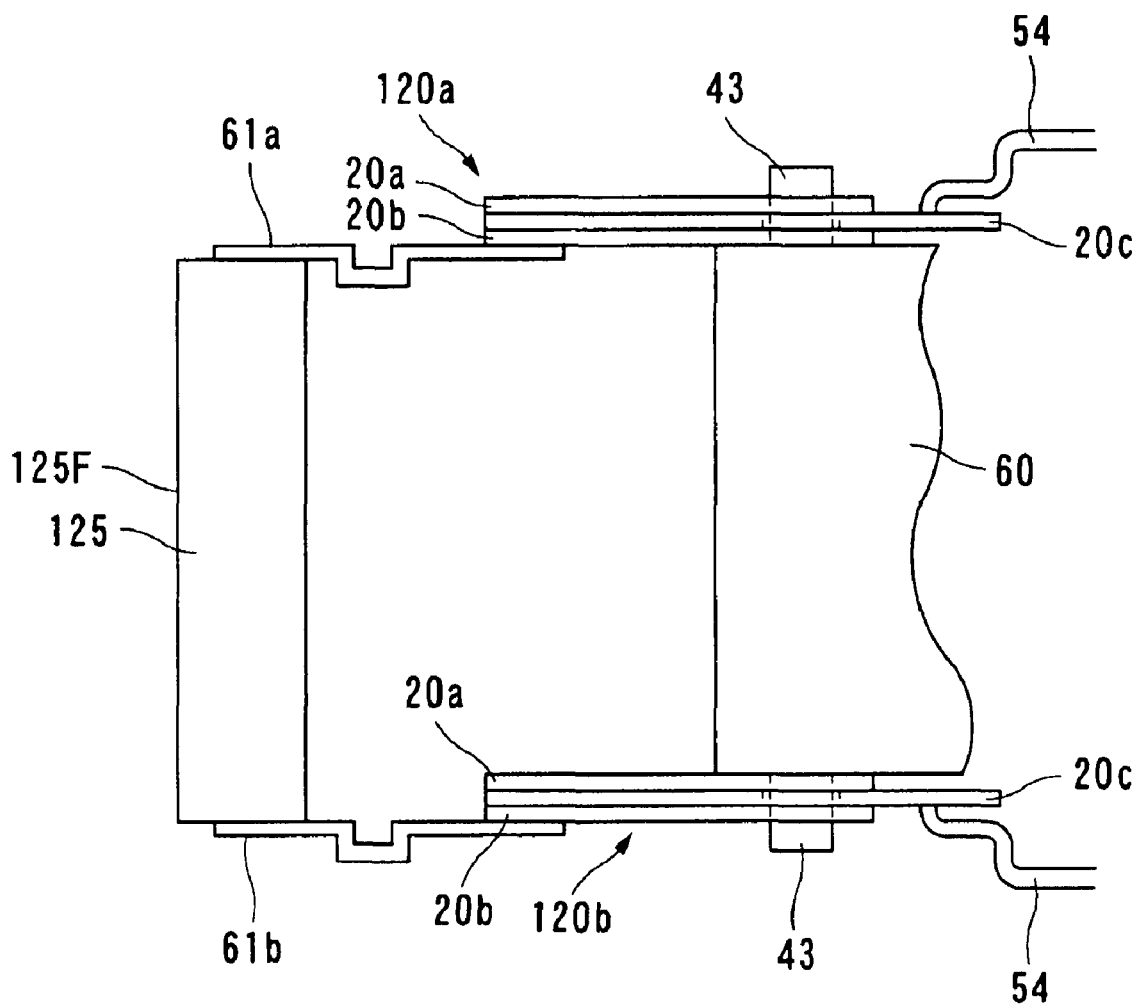
FIG. 9 is a side view of the principal part of a linear-type magnetic head device to which any of the embodiments of the invention is applied.
Figure 10:
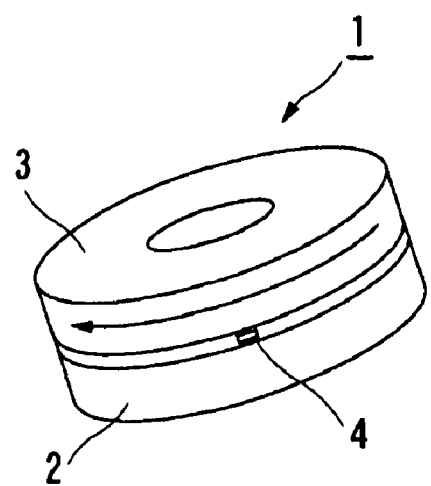
FIG. 10 is a perspective view of a known rotary drum.
Figure 11:
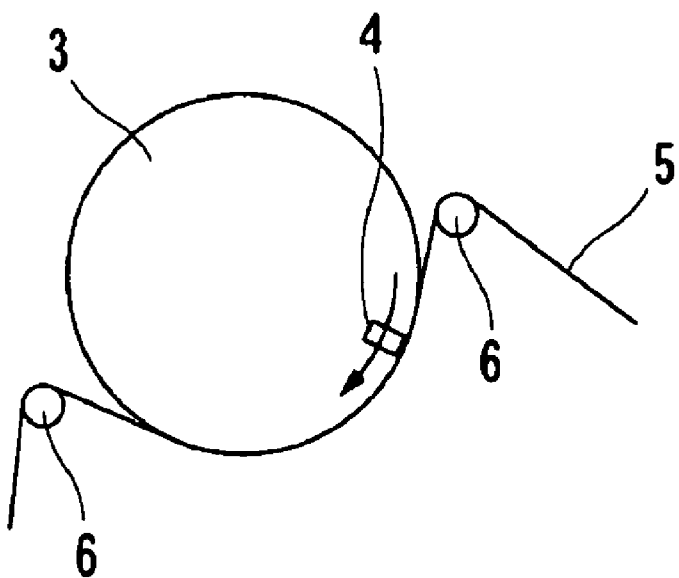
FIG. 11 is an explanatory view showing the arrangement of a magnetic tape and a rotary drum in a known magnetic head device.
Figure 12:
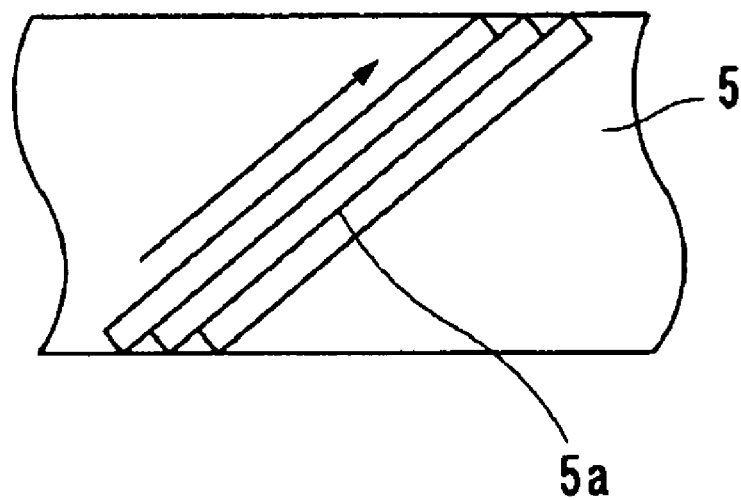
FIG. 12 is an explanatory view of tracks provided on the magnetic tape.
Figure 13:
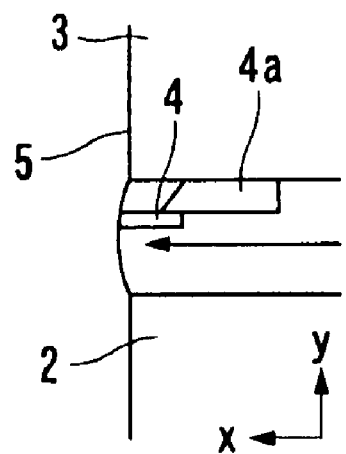
FIG. 13 is an explanatory view showing the arrangement of the magnetic tape and a magnetic head in the known magnetic head device.
Figure 14:
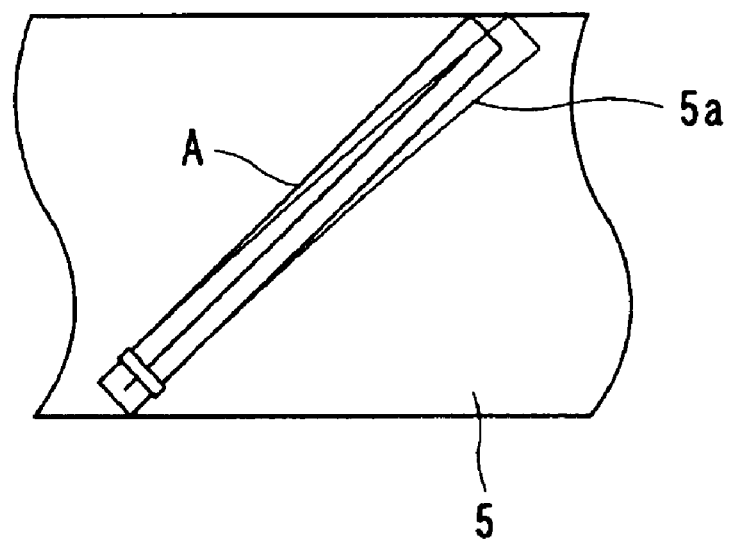
FIG. 14 is an explanatory view showing track offset on the magnetic tape.
Figure 15:
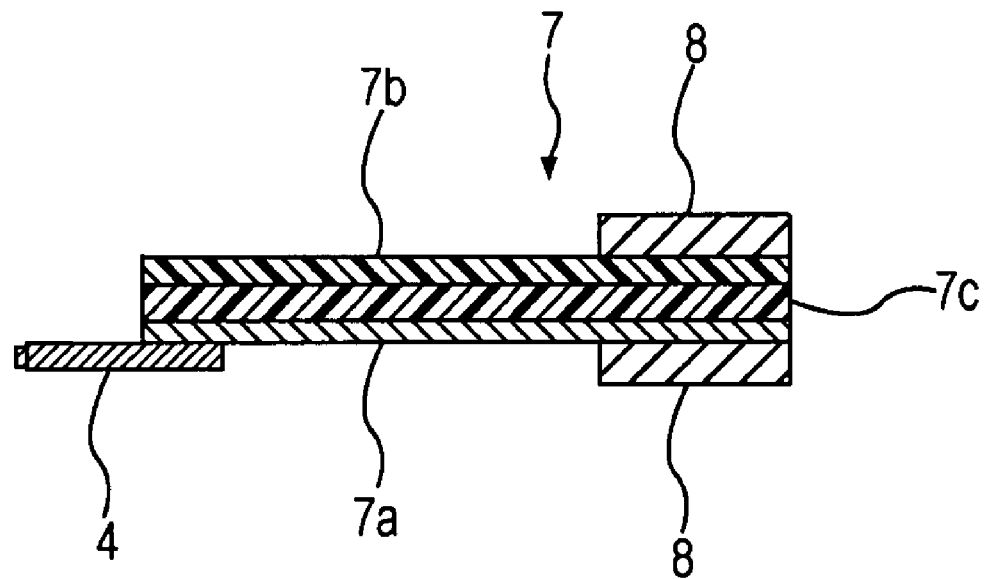
FIG. 15 is a sectional side view of an example of a known actuator.
Figure 16:
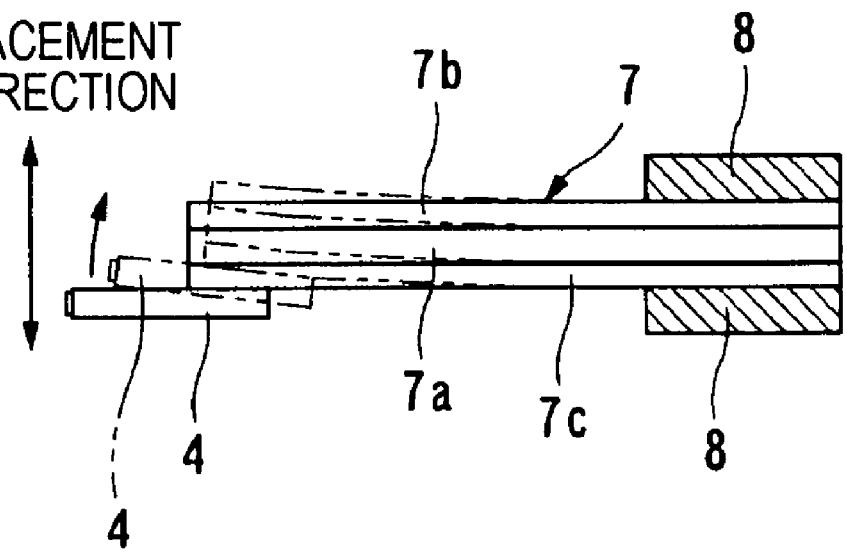
FIG. 16 is an explanatory view showing displacement of the known actuator.
Figure 17:
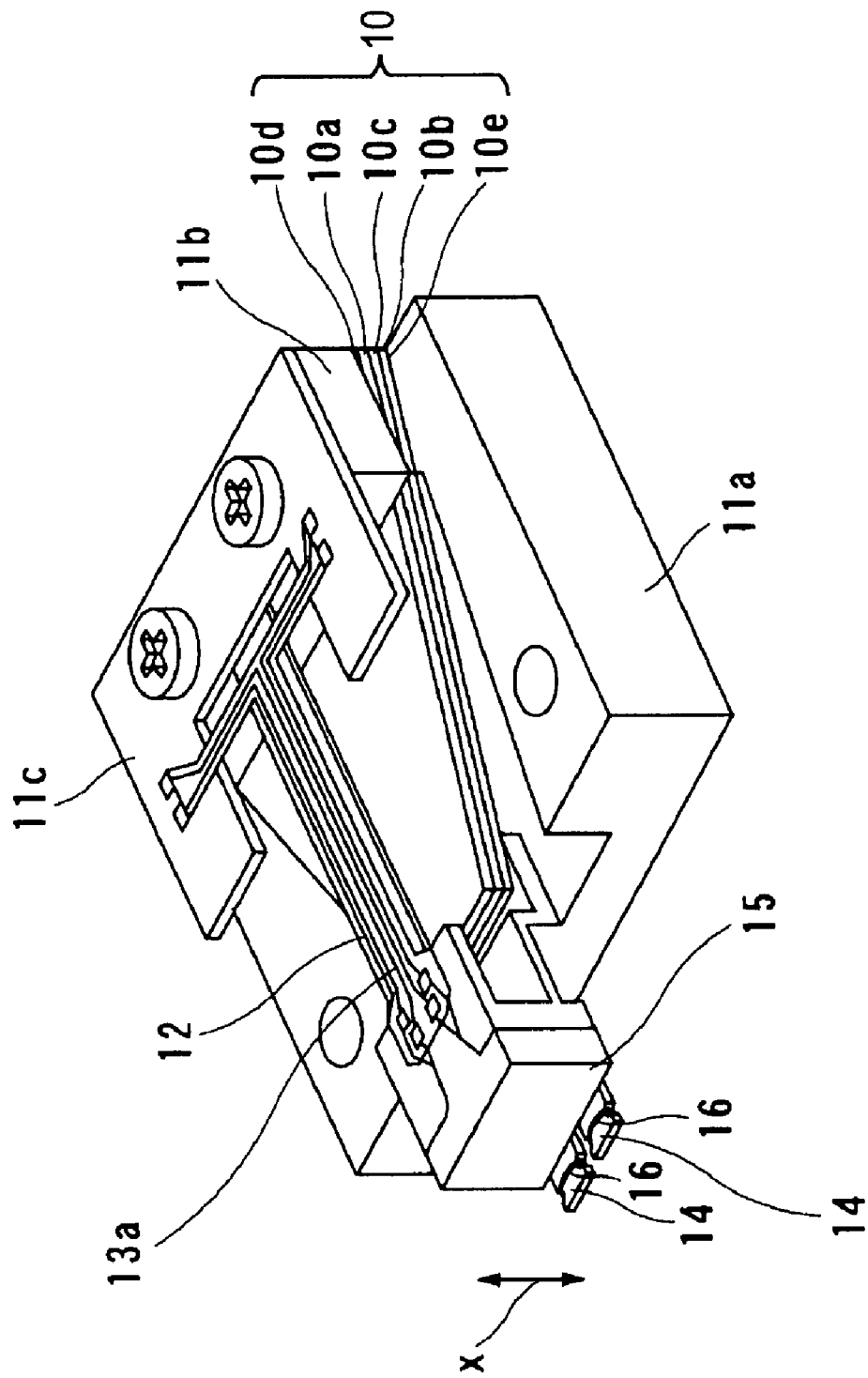
FIG. 17 is a perspective view of an example of a magnetic head device including the known actuator.
Figure 18A:
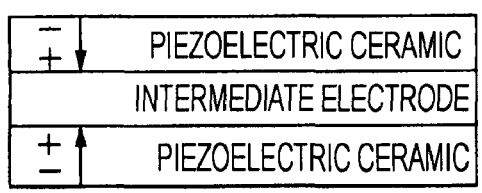
FIGS. 18A(a) and 18B(a) are explanatory views showing polarizing directions in driving methods for a piezoelectric bimorph, and FIGS. 18A(b) and 18B(b) are equivalent circuit diagrams of driving power sources.
Figure 18A:
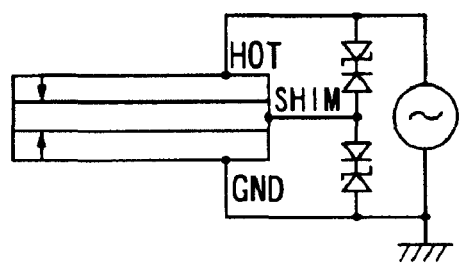
Figure 18B:
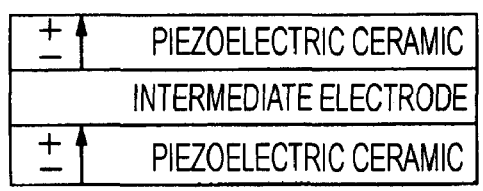
Figure 18B:
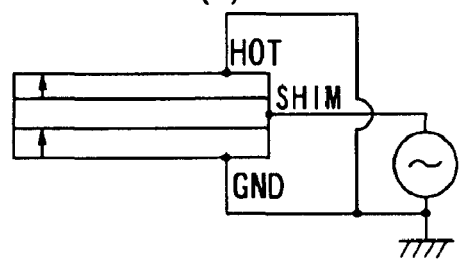
Figure 19:
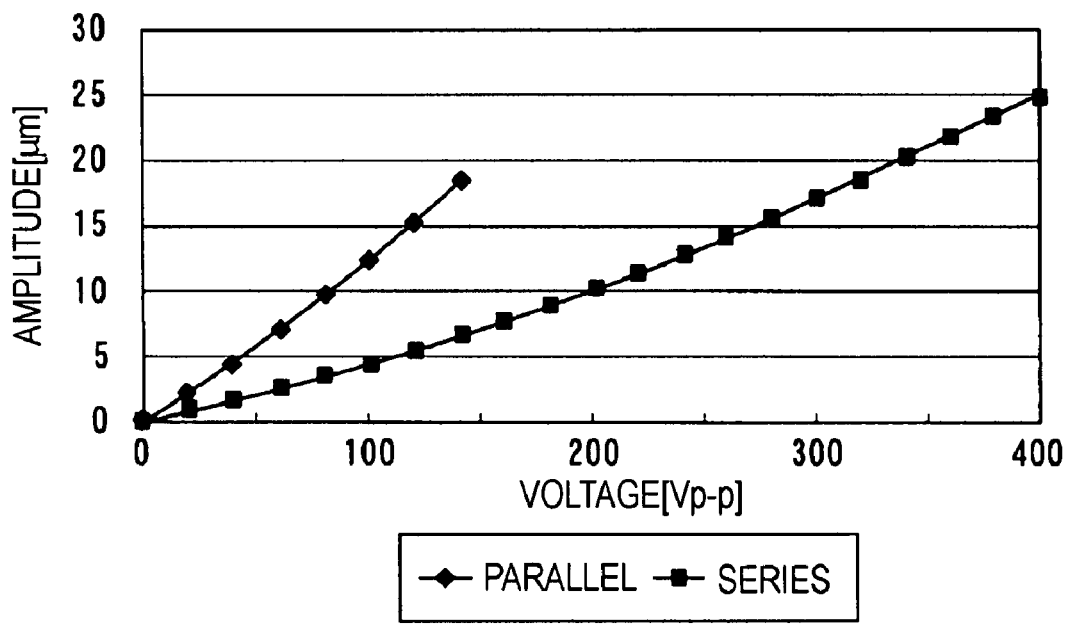
FIG. 19 is an amplitude-voltage characteristic view in the driving methods for the piezoelectric bimorph.
Figure 20:
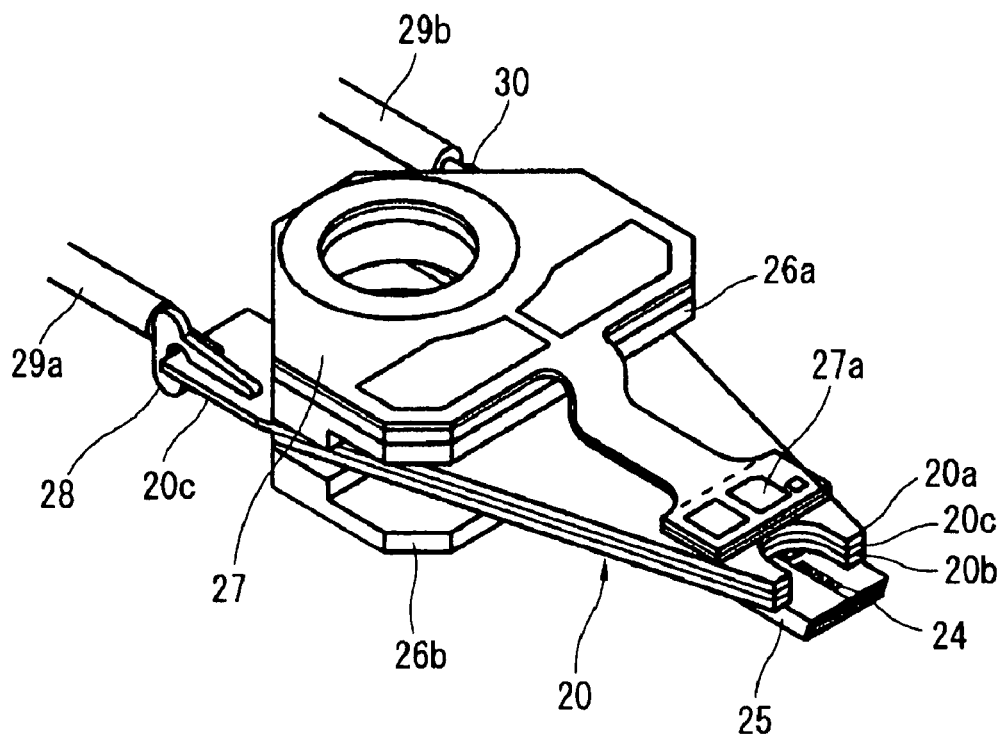
FIG. 20 is a perspective view of another embodiment of a known actuator.

FIG. 9 is a side view of the principal part of a magnetic head device for performing recording and reproduction in a linear manner, according to an embodiment of the present invention. Referring to FIG. 9, piezoelectric bimorphs 120a and 120b are respectively fastened to upper and lower surfaces of a magnetic head base 60 by screws 43, in a manner similar to that used in FIG. 4. In each of the piezoelectric bimorphs 120a and 120b, an intermediate electrode 20a is provided between a pair of piezoelectric plates 20a and 20b.

In each of the piezoelectric bimorphs 120a and 120b, a spring contact 54 for driving-voltage application is in contact with a fixed end of the intermediate 20c, in a manner similar to that used in FIG. 4.

Chip bases 61a and 61b are respectively bonded at one end to surfaces of the piezoelectric plates 20b provided at movable ends of the piezoelectric bimorphs 120a and 120b. A magnetic head chip 125 is bonded between the other ends of the chip bases 61a and 61b. A magnetic head (not shown) is mounted on a front side 125F of the magnetic head chip 125 facing a linear tape (not shown).

In the linear-type magnetic head device having the above-described configuration, wires for driving-voltage application do not need to be provided in the piezoelectric bimorphs 120a and 120b. This can reduce the number of components, manufacturing cost, and assembly cost.

It should be understood by those skilled in the art that various modifications, combinations, sub-combinations and alterations may occur depending on design requirements and other factors insofar as they are within the scope of the appended claims or the equivalents thereof.

What is claimed is:

1. An actuator for a magnetic recording and/or reproducing device comprising:
   a piezoelectric bimorph including a pair of piezoelectric elements, and an intermediate electrode provided between the piezoelectric elements;
   a conductive fastening member for fastening the piezoelectric elements to a base having a ground potential, wherein the conductive fastening member electrically connects individual ones of the pair of piezoelectric elements; and
   a contact member to which a predetermined voltage is applied, the contact member being in contact with the intermediate electrode.

2. The actuator according to claim 1, wherein a head chip having a magnetic head is bonded to a movable end of at least one of the piezoelectric, elements.

3. The actuator according to claim 1, wherein the base is a rotary drum.

4. The actuator according to claim 1, wherein the base is a magnetic head body opposing a linear tape on which recording and reproduction are performed in a linear manner.

5. A magnetic head device comprising an actuator, wherein the actuator includes:
   a piezoelectric bimorph including a pair of piezoelectric elements, and an intermediate electrode provided between the piezoelectric elements;
   a conductive fastening member for fastening fixed ends of the piezoelectric elements to a base having a ground potential, wherein the conductive fastening member electrically connects individual ones of the pair of piezoelectric elements; and
   a contact member to which a predetermined voltage is applied, the contact member being in contact with the intermediate electrode.

* * * * *